(12) United States Patent
Hlasny

(10) Patent No.: US 7,739,375 B2
(45) Date of Patent: Jun. 15, 2010

(54) SYSTEM AND METHOD FOR UPNP DISCOVERY ADVERTISEMENT BYEBYE BY PROXY

(75) Inventor: Daryl James Hlasny, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1801 days.

(21) Appl. No.: 10/842,233

(22) Filed: May 10, 2004

(65) Prior Publication Data

US 2005/0251549 A1   Nov. 10, 2005

(51) Int. Cl.
G06F 15/173 (2006.01)
(52) U.S. Cl. ...................................... 709/224
(58) Field of Classification Search ................. 709/208, 709/220, 221, 223, 224
See application file for complete search history.

(56) References Cited

U.S. PATENT DOCUMENTS

| | | | | |
|---|---|---|---|---|
| 6,571,277 | B1 | 5/2003 | Daniels-Barnes et al. ... | 709/213 |
| 7,031,945 | B1* | 4/2006 | Donner ........................ | 705/64 |
| 2001/0052084 | A1* | 12/2001 | Huang et al. .................. | 714/4 |
| 2002/0083143 | A1 | 6/2002 | Cheng ......................... | 709/208 |
| 2003/0063608 | A1 | 4/2003 | Moonen ...................... | 370/390 |
| 2003/0097425 | A1 | 5/2003 | Chen .......................... | 709/220 |
| 2003/0101294 | A1 | 5/2003 | Saint-Hilaire et al. ......... | 710/11 |
| 2004/0037258 | A1* | 2/2004 | Scherzer et al. ............. | 370/338 |
| 2004/0208159 | A1* | 10/2004 | Jung et al. ................... | 370/346 |
| 2004/0249923 | A1* | 12/2004 | Ko et al. ..................... | 709/223 |
| 2004/0255159 | A1* | 12/2004 | Williamson et al. ......... | 713/201 |
| 2006/0084417 | A1* | 4/2006 | Melpignano et al. ........ | 455/418 |
| 2006/0155980 | A1* | 7/2006 | Bodlaender ................. | 713/100 |

FOREIGN PATENT DOCUMENTS

| | | |
|---|---|---|
| WO | WO 0186428 | 11/2001 |
| WO | WO 0251067 | 6/2002 |
| WO | WO 03019864 | 3/2003 |

\* cited by examiner

*Primary Examiner*—Benjamin R Bruckart
*Assistant Examiner*—Scott M Sciacca
(74) *Attorney, Agent, or Firm*—Law Office of Gerald Maliszewski; Gerald Maliszewski

(57) ABSTRACT

In a UPnP network, a system and method have been provided for multicasting a byebye message by proxy. The method comprises: maintaining a list of available networked devices; maintaining a record of advertised UPnP elements; comparing the list of available networked devices to the record of advertised UPnP elements; and, multicasting a byebye message by proxy, for advertised UPnP elements associated with networked devices that are no longer available. The comparison of the list of available networked devices to the record of UPnP elements includes determining advertised UPnP elements in the record that cannot be cross-referenced to available networked devices. The method further comprises removing UPnP elements from the record in response to the comparison.

18 Claims, 6 Drawing Sheets

SYSTEM AND METHOD FOR UPNP DISCOVERY ADVERTISEMENT BYEBYE BY PROXY

BACKGROUND OF THE INVENTION

1. Field of the Invention

This invention generally relates to UPnP communications and, more particularly, to a system and method for supplying a byebye notification for devices that fail to advertise when they leave a UPnP network.

2. Description of the Related Art

UPnP is a technology used for device and service discovery in a home network. UPnP takes a decentralized approach to service discovery. A networked device announces that it is present, when it is connected or becomes active. When initially connected, a search capacity for other networked devices and UPnP services is provided. However, a networked device is typically expected to search only when first connected, and otherwise depends on advertisements to become aware of new devices being networked, or known devices leaving the network. That is, networked devices are expected to announce when they enter the network (Notify with ssdp:alive) and leave the network or become unavailable (Notify with ssdp:byebye). However, it is possible for a device to be removed from the network without making a ssdp:byebye announcement. For example, when a device is powered off without going through a shutdown process. In this case the previous advertisement will eventually expire, because there is no re-advertisement by the removed device. The duration, for which an advertisement is valid, is transmitted with the advertisement, and is known as CACHE-CONTROL. UPnP specifies that this duration should be greater than 30 minutes (1800 seconds).

In wireless networks it is very common for a device to become disassociated from the network, if it moves outside the range of the access point (AP). In this case, the device is removed from the network without the ssdp:byebye message being sent. All other networked devices assume that the removed device is still available, and may attempt to access its services. The assumption that the removed device is available may result in a bad user experience. It is desirable to provide the byebye message if the removed device moves out of range of the AP and does not send the message. Even in a wired network, a similar problem may result when a device is powered down abruptly or the network cable is disconnected.

It would be advantageous if byebye advertisement could be supplied for a device that is removed from a network, if that device fails to make the advertisement itself.

SUMMARY OF THE INVENTION

The present invention method links lower layer information, concerning the availability of a networked device, to the service advertisement mechanism of UPnP. That is, the UPnP ssdp:byebye multicast message is generated for devices that are not able to perform this function before their departure from the network. The use of the present invention makes for a better user experience, as it provides a reliable and responsive indication of when networked devices are removed. The invention is applicable to wireless networks, where networked devices are mobile and may become unavailable due to being moved out of range of the access point. The invention is also applicable to other scenarios, where a device is removed from a network before advertising that it is no longer available.

Accordingly, in a UPnP network, a method is provided for multicasting a byebye message by proxy. The method comprises: maintaining a list of available networked devices; maintaining a record of advertised UPnP elements (UPnP devices and UPnP services); comparing the list of available networked devices to the record of advertised UPnP elements; and, multicasting a byebye message for advertised UPnP elements that are associated with networked devices that are no longer available.

The comparison of the list of available networked devices to the record of UPnP elements includes determining advertised UPnP elements in the record that cannot be cross-referenced to an available networked devices. The method further comprises removing UPnP elements from the record in response to the comparison.

The record of advertised UPnP elements includes UPnP element types such as root devices, each device embedded in a root device, services associated with a root device, and each service associated with an embedded device. A byebye message is multicast for each UPnP element type. Likewise, the record of advertised UPnP elements may include notification type (NT) and unique service name (USN) fields for each advertised UPnP element. The NT and USN fields can be included in the byebye message.

If a networked device is available through a plurality of network interfaces, UPnP elements associated with the networked device are removed from the record if a search, via each network interface, fails to detect the networked device. Then, a byebye message is multicast for advertised UPnP elements associated with networked device via each of the network interfaces. The present invention method is applicable to Bluetooth, IEEE 802.11 wireless local area networks, IEEE 802.3 Ethernet network, and other network types.

Additional details of the above-described method, as well as a system for multicasting a byebye message by proxy in a UPnP network, are provided below.

DETAILED DESCRIPTION OF THE PREFERRED EMBODIMENTS

Figure 1:
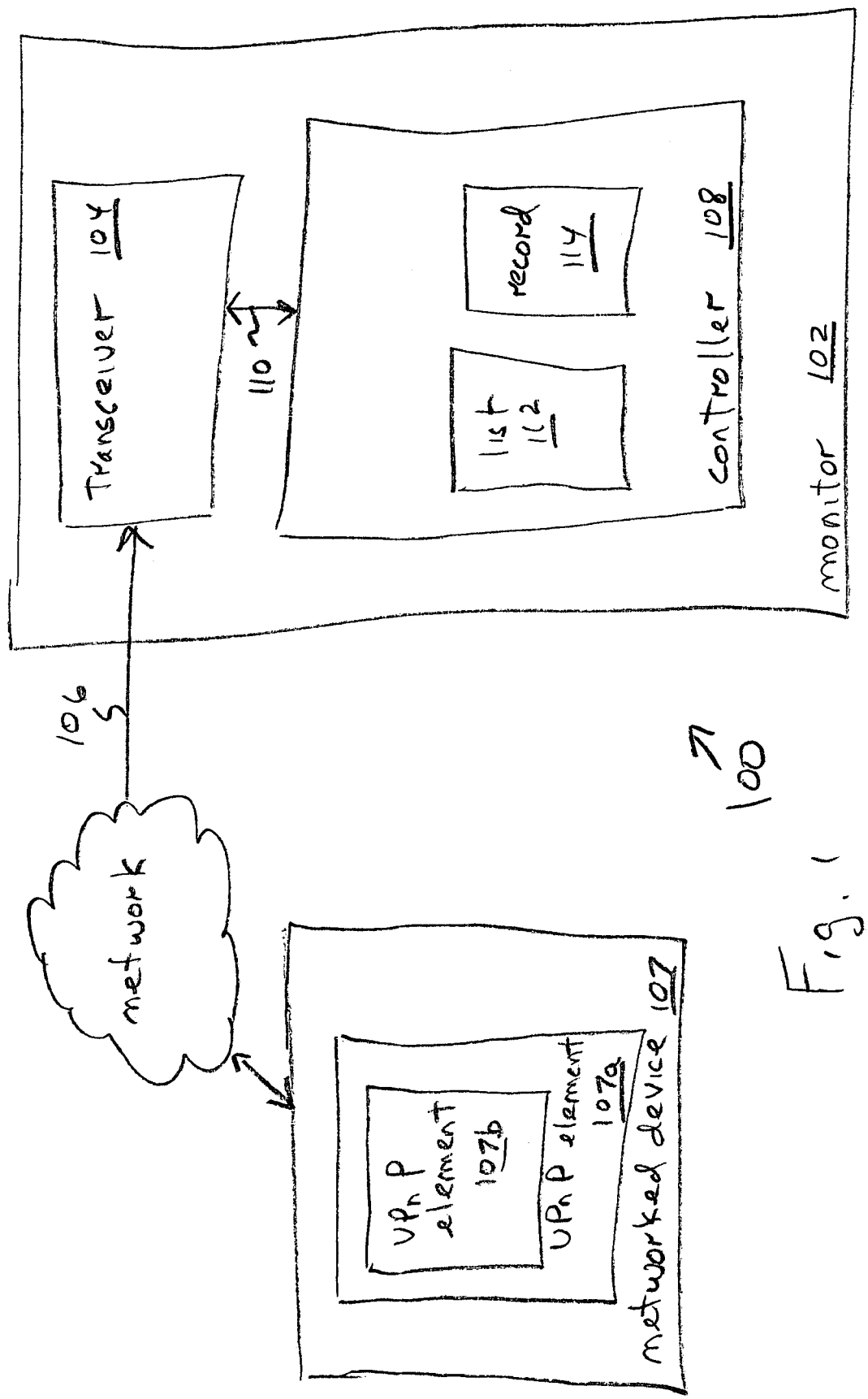
FIG. 1 is a schematic block diagram of the present invention system for multicasting a byebye message by proxy, in a UPnP network.

FIG. 1 is a schematic block diagram of the present invention system for multicasting a byebye message by proxy, in a UPnP network. The system 100 comprises a monitor 102. The monitor 102 includes a transceiver 104 having a network interface on line 106 to search for available networked devices and to receive advertised UPnP element information. Shown, is a networked element 107, with UPnP elements 107a and 107b. Line 106 may represent either a hardwired or radio frequency (RF) channel that may be shared or dedicated to particular users. A controller 108 has an interface on line 110 to receive the networked device and UPnP element information from the transceiver 104. The controller 108 maintains a list 112 of available networked devices and a record 114 of advertised UPnP elements. The controller 108 supplies a signal on line 110 in response to comparing the list of available networked devices to the record of advertised UPnP elements. The transceiver 104 multicasts a byebye message on line 106 for advertised UPnP elements associated with networked devices that are no longer available, in response to the signal from the controller 108.

Generally, the controller 108 determines advertised UPnP elements in the record 114 that cannot be cross-referenced to available networked devices. The controller 108 removes UPnP elements from the record 114 that are associated with unavailable networked devices.

The possible UPnP element types include root devices, each device embedded in a root device, services associated with a root device, and each service associated with an embedded device. The controller 108 maintains a record for each element type. Likewise, the transceiver 104 multicasts a byebye message for each UPnP element type associated with a networked device that is no longer available. For example, if a first networked device 107 has an associated device 107a and root device service 107b as UPnP elements, a byebye message is multicast for both elements 107a and 107b.

Conventionally, the transceiver 104 monitors multicast UPnP element advertisements, and the controller 108 enters the UPnP element to the record 114 in response to the transceiver 104 receiving an advertisement. More specifically, the transceiver 104 receives a ssdp:alive message for a UPnP element. Then, the controller 108 extracts a universal resource locator (URL) parameter from the alive message and uses the URL parameter to determine a MAC address for a networked device. Using the determined MAC address, the list 112 of available networked devices is accessed. If the determined MAC address is found in the list 112 of available networked devices, then the UPnP element is added to the record 114.

Conventionally, if the transceiver 104 receives a byebye message from a UPnP element, the controller 108 removes the advertised UPnP element from the record 114 of UPnP elements in response to the transceiver 104 receiving the byebye message.

The controller 108 also maintains notification type (NT) and unique service name (USN) fields for each advertised UPnP element in the record 114. The transceiver 104 multicasts the NT and USN fields in the byebye message.

Figure 2:
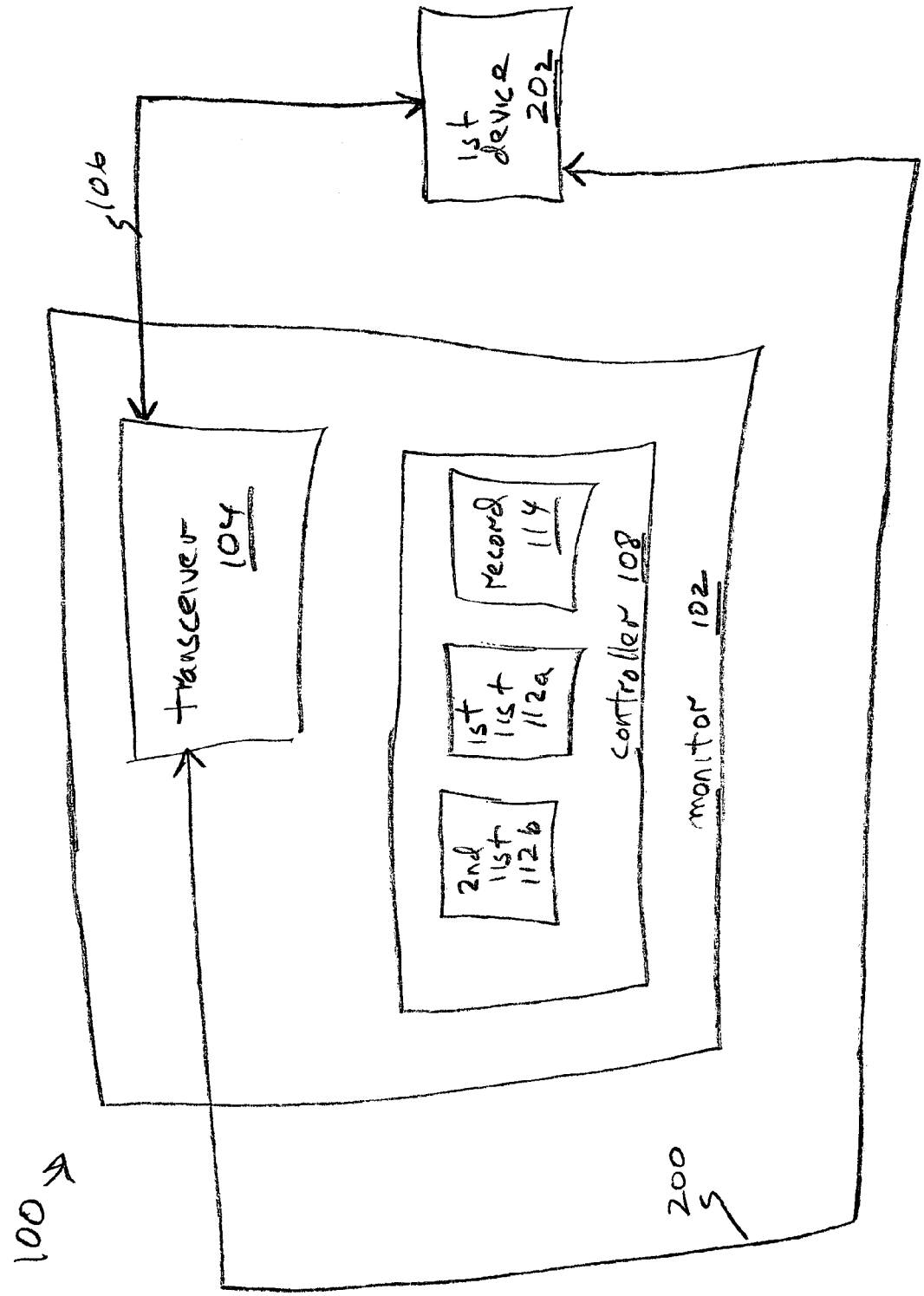
FIG. 2 is a schematic block diagram illustrating a variation of the system of FIG. 1.

FIG. 2 is a schematic block diagram illustrating a variation of the system of FIG. 1. In this aspect, the transceiver 104 has a first network interface on line 106 and a second network interface on line 200. The controller 108 maintains a first list 112a with the availability of a first networked device 202 accessible through the first network interface on line 106 and a second list 112b with the availability of the first networked device 202 through the second network interface on line 200. If the transceiver 104 fails to detect the first networked device 202 in response to performing a search for the first networked device 202 via the first and second network interfaces, and it multicasts a byebye message for UPnP elements associated with the first networked device 202 via both the first and second network interfaces on lines 106 and 200, respectively. That is, the transceiver 104 does not multicast a byebye message unless the first networked device becomes unavailable via both (all) network interfaces.

More generally, the transceiver has a plurality of network interfaces. Two network interfaces are shown, but the invention is not limited to any particular number. The controller maintains a list with the availability of a first networked device accessible through each network interface. If the transceiver fails to detect the first networked device in response to performing a search for the first networked device via each network interface, it multicasts a byebye message for UPnP elements associated with the first networked device via each network interface.

Figure 3:
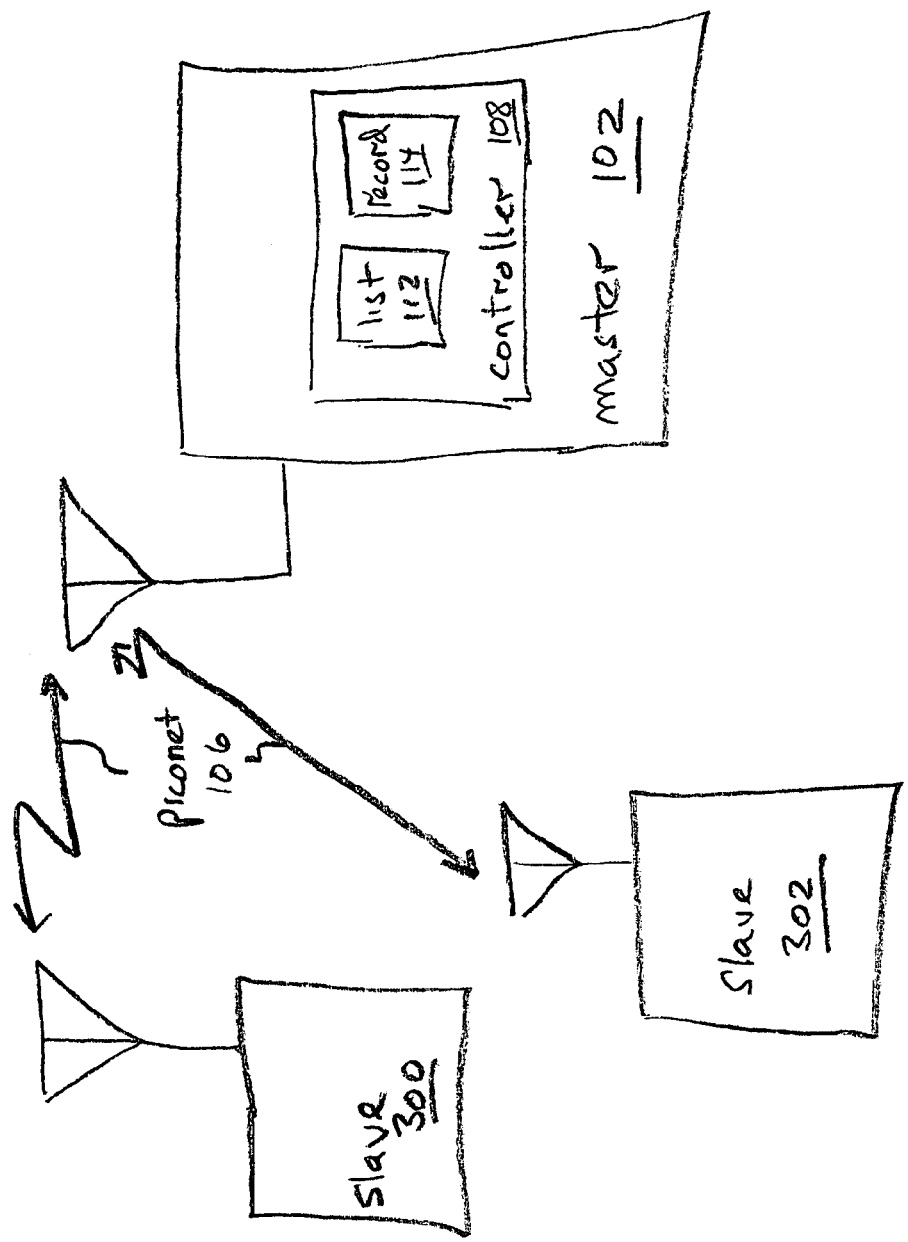
FIG. 3 is a schematic block diagram illustrating the invention in the context of a Bluetooth network.

FIG. 3 is a schematic block diagram illustrating the invention in the context of a Bluetooth network. In this aspect, the monitor 102 is a master device periodically polling slave devices 300 and 302 in a Bluetooth piconet 106. The master device (monitor) 102 maintains a list 112 of slave devices that acknowledge the polling.

Figure 4:
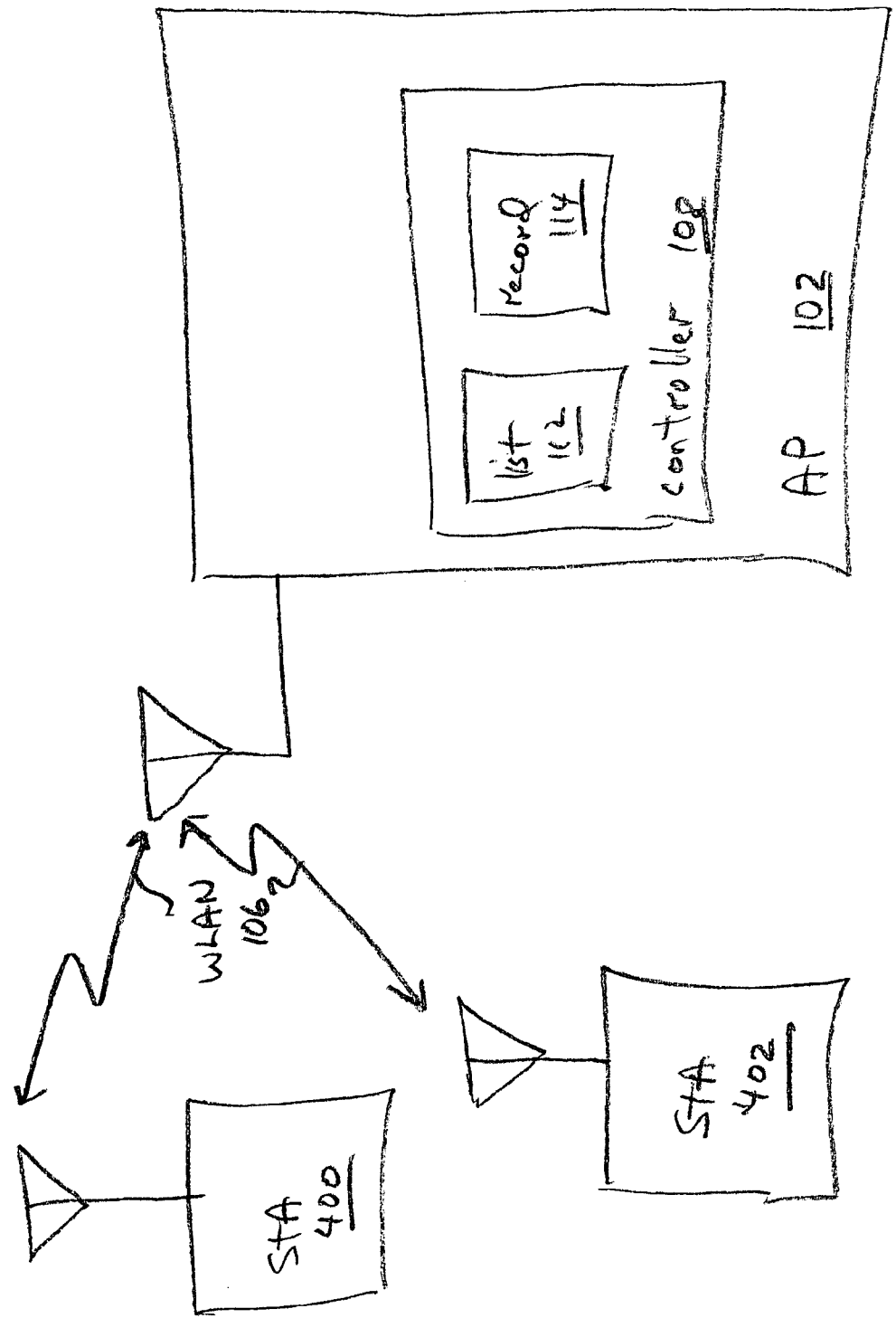
FIG. 4 is a schematic block diagram illustrating the invention in the context of an IEEE 802.11 network.

FIG. 4 is a schematic block diagram illustrating the invention in the context of an IEEE 802.11 network. In this aspect, the monitor 102 is an access point (AP) that polls station (STA) devices 400 and 402 registered with the AP 102 in an IEEE 802.11 wireless local area network (WLAN) 106. The AP 102 maintains a list 112 of STA devices sending acknowledgements in response to the polling.

Figure 5:
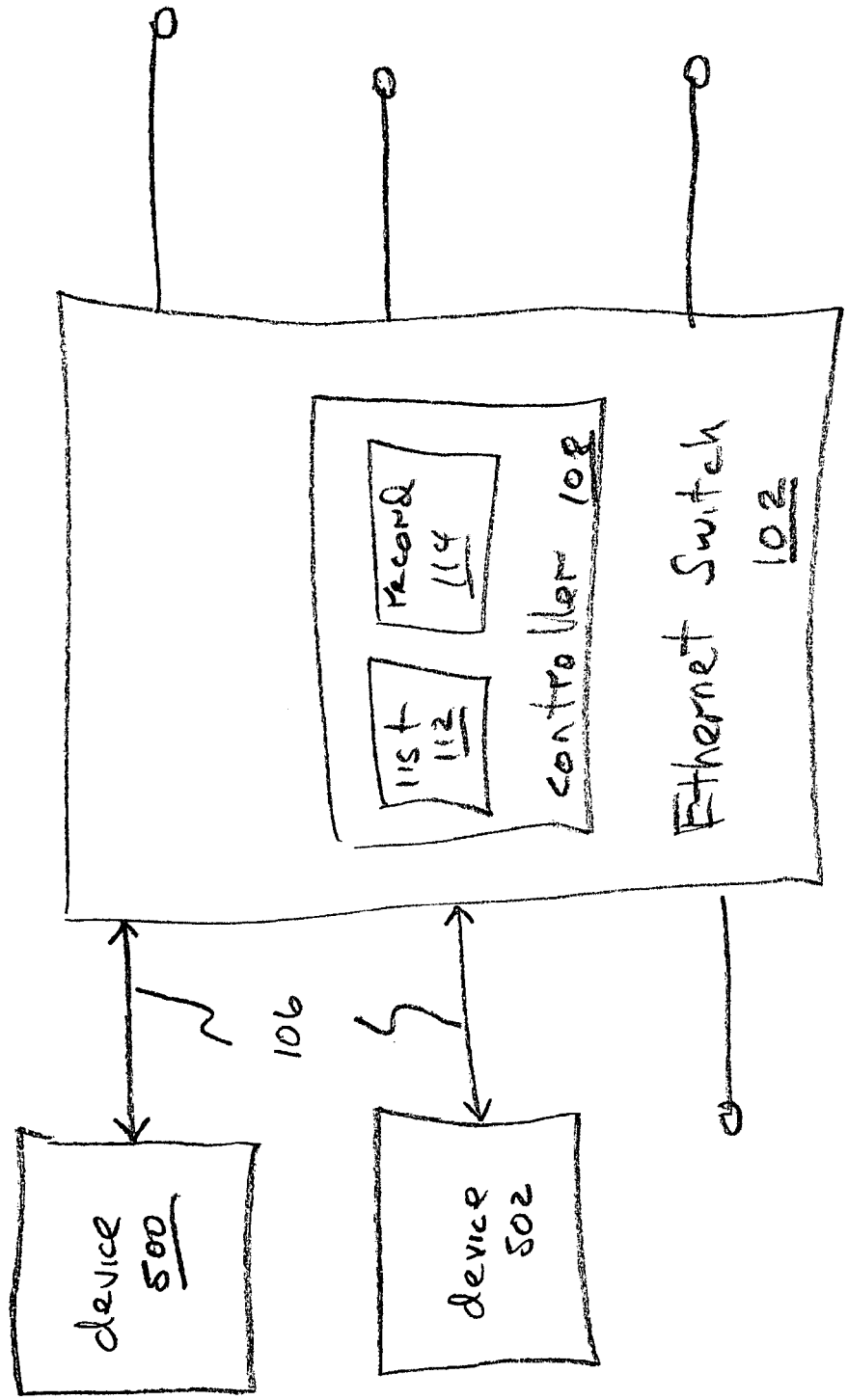
FIG. 5 is a schematic block diagram illustrating the invention in the context of an IEEE 802.3 Ethernet network.

FIG. 5 is a schematic block diagram illustrating the invention in the context of an IEEE 802.3 Ethernet network. In this aspect, the monitor 102 is an Ethernet switch monitoring link integrity signals from connected devices 500 and 502 in an IEEE 802.3 Ethernet network 106. The Ethernet switch 102 maintains a list 112 of devices sending the link integrity signals.

Functional Description

The present invention solves the inconsistency problem that may exist between a local store of UPnP device/service records, and the actual availability of an associated device in a network. Conventional UPnP technology requires that an ssdp:byebye message be broadcast. This byebye message informs other networked devices that a particular UPnP device/service is not available. Conventional UPnP technology uses a time-out mechanism to automatically remove a UPnP device/service record, if that device/service has not been advertised in the time-out period. UPnP recommends the minimum duration of the time-out to be 30 minutes. Therefore, a UPnP device/service availability inconsistency may exist for up to 30 minutes. This inconsistency provides a bad user experience by presenting a UPnP device/service as being available, when in fact it is not.

This invention defines the methods used to implement a ssdp:byebye proxy service that monitors the availability of a networked device, and provides the ssdp:byebye advertisement when that device is removed from the network without first sending a ssdp:byebye advertisement. The method performing this function can be broken into the following processes as summarized below:

Process 1: Real time monitoring of networked device availability—in this process the native monitoring function of the network is used to build a list of available devices. Changes in this list are detected and sent to the other processes to trigger operations.

Process 2: Monitoring UPnP element advertisements and list building—in this process an UPnP element advertised record is built and maintained, of the UPnP devices and services that have advertised and associated with available networked devices. A UPnP device or service is removed from this record if a ssdp:byebye advertisement is received, or if the advertisement expires.

Process 3: Proxy byebye notification—this process is triggered when Process 1 detects that a networked device has become unavailable, but still exists in the UPnP element advertised record. In this case, a ssdp:byebye notification message is multicast, and the networked device is removed from the UPnP networked device available list, and its associated UPnP elements are removed from the advertised record.

A detailed description of each process follows:

Process 1: Real-time Monitoring of Networked Device Availability

The real-time networked device monitoring varies, depending on the particular networking technology used, although the end results are the same. The target is to build and maintain a list of available networked devices. The list typically consists of MAC addresses. This list is made available to the other processes, and the notification of any changes in the list is made in real-time to the other process. Some examples of how this can be accomplished are given below:

Bluetooth PAN Profile

In the case of a Bluetooth PAN Profile, the byebye proxy service resides in the Network Access Point (NAP). This is the master device in the Bluetooth piconet, and it is always aware of the PANU (slave) devices to which it is connected. Bluetooth uses a master-slave approach to communication. The master must always poll the slave before the slave is allowed to transmit to the master. The master is always aware of connected slave devices. The initiation of a connection to a slave is made via a paging process where the master controls which devices are allowed to be part of the piconet. A slave that is part of the piconet is periodically polled by the master. If the slave does not respond, its failure to do so is detected by the master, providing an immediate indication that the slave is no longer an available networked device. Using this mechanism, the list of available networked devices can be built and maintained.

802.11 Wireless Network

An 802.11 wireless network has both a centrally controlled, and distributed access control mechanisms. The centrally controlled mechanism, known as the point coordination function (PCF), is applicable to this invention. In this case, the access point (AP) creates a list of stations to be polled, in response to stations registering with the AP and requesting to be polled. The AP then regularly polls the station while also transmitting packets to the stations. The stations acknowledge receiving packets from the point coordinator (PC). This acknowledgement is used by the PC to maintain the list of available networked devices and to determine when a device has left the network, or become unavailable.

802.3 Ethernet Switch

An Ethernet Switch is a device that interconnects physical Ethernet wires originating from multiple end point devices. It performs a switching function for received data packets by looking at the destination address of the packets, and transmitting the data packets on the appropriate physical interface. It is able to do this function by learning which devices are connected, based on the source address of the packets that it receives on the corresponding interface. In this way, the switch identifies devices that can be reached through a particular physical interface, and can build a table of available networked devices. Disconnection of a physical link, or of a networked device, can be detected by the link integrity test signal. The transmitting device sends the link integrity test signal when there is no data to transmit. The absence of the link integrity test signal is taken to mean that a corresponding device is unavailable. In this manner, the available networked device list can be built and maintained.

Process 2: Monitoring UPnP Element Advertisements and List Building

In this process, a record of advertised UPnP elements (devices and services) is built and maintained using the methods defined below:

1. The monitor listens for the simple service discovery protocol (SSDP) advertisement messages on the standard multicast IP address and UDP port number for discovery advertisements.

2. When a ssdp:alive message is received, the following processing occurs:
   a) The location URL parameter is used to determine the MAC address. This may requires the use of the DNS to first find the IP address and then the use of address resolution protocol (ARP) to determine the MAC address.
   b) If the MAC address is part of the available networked device list (from process 1), the device/service (UPnP element) is added to the UPnP element advertised record. Otherwise it is ignored.
   c) For UPnP elements in the record, the following associated service information, necessary for the ssdp:byebye message, is stored:
      NT (Notification Type)—including the Device Type or Service Type, or Device ID, or Root device indication;
      USN (Unique Service Name)—including the unique device ID and Service or Device type; and,
      MAC address.

3. When a ssdp:byebye message is received, the following processing occurs:
   a) The USN & NT is compared against the USN & NT currently in the UPnP element advertised record.
   b) If there is a match, the corresponding entry is removed.

Process 3: Proxy ByeBye Notification

In this process, the networked device available list and the UPnP element advertised record are compared whenever a networked device is removed from the networked device available list. For UPnP elements in the UPnP element advertised record, but not associated with a device in the networked device available list, a Notify with ssdp:byebye messages is multicast. There is a separate ssdp:byebye message for each of the services and devices associated with the networked device that is no longer available. The information stored in Process 2 is used to form each of the discovery advertisement Notify with ssdp:byebye messages.

The invention is applicable to the typical case where a discoverable networked device has a single network interface. However, there may be situations where a device has multiple network interfaces. Both interfaces may connect to the same home network (i.e., same IP subnet) or each to a different home network. UPnP does not clearly define the appropriate operation in each of these cases so the actual operation of the UPnP element advertisement is not clear and it likely to be vendor dependent. The present invention does not transmit the ssdp:byebye message, if the networked device is still available through another network interface. To resolve this situation the ssdp:byebye proxy service first checks that the device is no longer available on the network before transmitting the ssdp:byebye. This can be accomplished via an UPnP search, or other any other method that validates that the device is still connected to the network.

Figure 6:
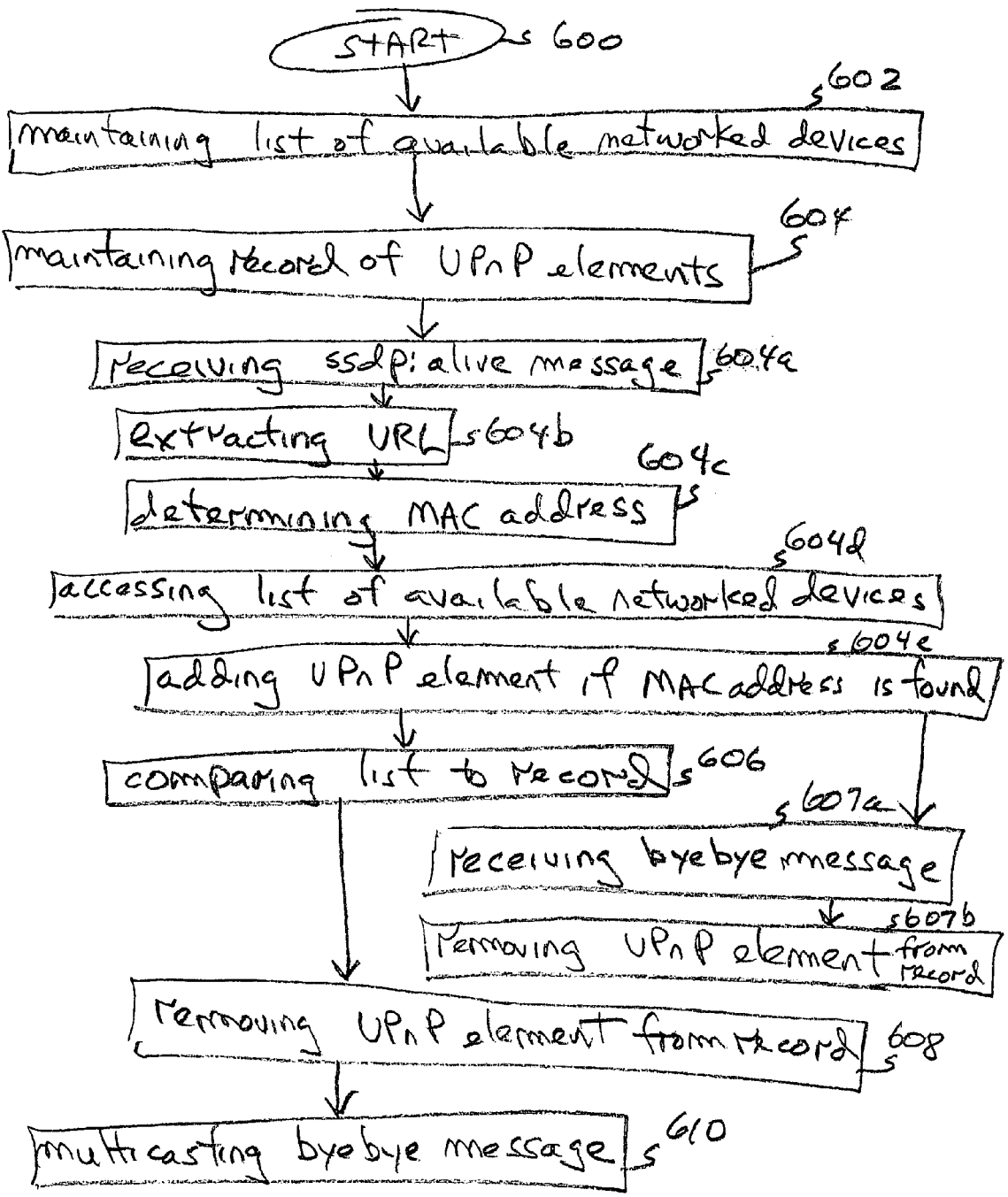
FIG. 6 is a flowchart illustrating the present invention method for multicasting a byebye message by proxy in a UPnP network.

FIG. 6 is a flowchart illustrating the present invention method for multicasting a byebye message by proxy in a UPnP network. Although the method is depicted as a sequence of numbered steps for clarity, no order should be inferred from the numbering unless explicitly stated. It should be understood that some of these steps may be skipped, performed in parallel, or performed without the requirement of maintaining a strict order of sequence. The method starts at Step 600.

Step 602 maintains a list of available networked devices. Step 604 maintains a record of advertised UPnP elements. Step 606 compares the list of available networked devices to the record of UPnP elements. That is, Step 606 determines advertised UPnP elements in the record that cannot be cross-referenced to available networked devices. Step 608, in response to comparing the list of available networked devices to the record of UPnP elements, removes UPnP elements from the record that are associated with unavailable networked devices. Step 610 multicasts a byebye message, for advertised UPnP elements associated with networked devices that are no longer available.

In one aspect, maintaining a record of advertised UPnP elements in Step 604 includes maintaining a record of UPnP element types selected from the group including root devices, each device embedded in a root device, services associated with a root device, and each service associated with an embedded device. Then, Step 610 multicasts a byebye message for each UPnP element type associated with a networked device that is no longer available.

Conventionally, Step 604 maintains a record of advertised UPnP elements by: monitoring multicast UPnP element advertisements; and, entering the UPnP element to the record in response to receiving an advertisement. More specifically, Step 604 may include the following substeps. Step 604a receives a ssdp:alive message for a UPnP element. Step 604b extracts a universal resource locator (URL) parameter from the alive message. Step 604c uses the URL parameter to determine a MAC address for a networked device. Step 604d accesses the list of available networked devices using the determined MAC address. Step 604e adds the UPnP element to the record, if the determined MAC address is found in the list of available networked devices.

Conventionally, the method also includes the following steps. Step 607a receives a byebye message from a UPnP element. Step 607b removes the advertised UPnP element from the record of UPnP elements in response to receiving the byebye message.

Step 604 also includes maintaining notification type (NT) and unique service name (USN) fields for each advertised UPnP element in the record. Then, Step 610 adds the NT and USN fields to the byebye message when multicasting, for advertised UPnP elements associated with networked devices that are no longer available.

In one scenario, maintaining a list of available networked devices in Step 602 includes maintaining a first list with the availability of a first networked device accessible through a first network interface and a second list with the availability of the first networked device through a second network interface. Then, removing UPnP elements from the record that are associated with unavailable networked devices (Step 608) includes removing UPnP elements from the record in response to:

performing a search for the first networked device via the first network interface and detecting the unavailability of the first networked device; as well as, performing a search for the first networked device via the second network interface and detecting the unavailability of the first networked device. Then, Step 610 multicasts a byebye message for UPnP elements associated with the first networked device via both the first and second network interfaces.

More generally, Step 602 may maintain a plurality of lists with the availability of the first networked device accessible through a corresponding plurality of network interfaces. Then, Step 608 removes UPnP elements from the record that are associated with unavailable networked devices further by performing a search for the first networked device via the plurality of network interfaces and detecting the unavailability of the first networked device. Step 610 multicasts a byebye message for UPnP elements associated with the first networked device via each of the plurality of network interfaces.

In one aspect of the method, Step 602 maintains a list of available networked devices in response to a master device periodically polling slave devices in a Bluetooth piconet, and maintaining a list of slave devices that acknowledge the polling. Alternately, an access point (AP) polls station (STA) devices registered with the AP in an IEEE 802.11 wireless local area network (WLAN), and maintains a list of STA devices sending acknowledgements in response to the polling. In a different aspect, an Ethernet switch monitors link integrity signals from connected devices in an IEEE 802.3 Ethernet network, and maintains a list of devices sending the link integrity signals.

A system and method have been described to multicast a byebye message for a device leaving the network, in the event that the removed device cannot transmit its own advertisement. Examples have been given of how the invention would operate in specific types of networks. That is, the invention has been explained in the context of Bluetooth, IEEE 802.11, and IEEE 802.3 networks. However, the present invention is not necessarily limited to particular communication formats or just these example networks. Other variations and embodiments of the invention will occur to those skilled in the art.

We claim:

1. In a UPnP network, a method for multicasting a byebye message by proxy, the method comprising:

maintaining a list of available networked devices, including a first list with the availability of a first networked device accessible through a first network interface and a second list with the availability of the first networked device through a second network interface;

maintaining a record of advertised UPnP elements as follows:

receiving a ssdp:alive message for a UPnP element;

extracting a universal resource locator (URL) parameter from the alive message;

using the URL parameter to determine a MAC address for a networked device;

using the determined MAC address, accessing the list of available networked devices; and, if the determined MAC address is found in the list of available networked devices, adding the UPnP element to the record;

comparing the list of available networked devices to the record of UPnP elements to determine advertised UPnP elements in the record that cannot be cross-referenced to available networked devices, and so determine network devices that left the network without broadcasting a byebye message;

in response to comparing the list of available networked devices to the record of UPnP elements, removing UPnP elements from the record that are associated with unavailable networked devices that left the network without broadcasting a byebye message as follows:

performing a search for the first networked device via the first network interface;

detecting the unavailability of the first networked device;

performing a search for the first networked device via the second network interface; and,
detecting the unavailability of the first networked device; and,
multicasting a byebye message for advertised UPnP elements that are no longer available, associated with networked devices that are no longer available that left the network without broadcasting a byebye message, including multicasting a byebye message for UPnP elements associated with the first networked device via both the first and second network interfaces.

2. The method of claim 1 wherein maintaining a record of advertised UPnP elements includes maintaining a record of UPnP element types selected from the group including root devices, each device embedded in a root device, services associated with a root device, and each service associated with an embedded device; and,
wherein multicasting a byebye message, for advertised UPnP elements associated with networked devices that are no longer available that left the network without broadcasting a byebye message, includes multicasting a byebye message for each UPnP element type.

3. The method of claim 1 wherein maintaining a record of advertised UPnP elements includes:
monitoring multicast UPnP element advertisements; and,
entering the UPnP element to the record in response to receiving an advertisement.

4. The method of claim 1 wherein maintaining a record of advertised UPnP elements includes maintaining notification type (NT) and unique service name (USN) fields for each advertised UPnP element in the record; and,
wherein multicasting a byebye message, for advertised UPnP elements associated with networked devices that are no longer available, includes adding the NT and USN fields to the byebye message.

5. The method of claim 1 further comprising:
receiving a byebye message from a UPnP element; and,
removing the advertised UPnP element from the record of UPnP elements in response to receiving the byebye message.

6. The method of claim 1 wherein maintaining a list of available networked devices in the network includes maintaining a plurality of lists with the availability of the first networked device accessible through a corresponding plurality of network interfaces;
wherein removing UPnP elements from the record that are associated with unavailable networked devices further includes:
performing a search for the first networked device via the plurality of network interfaces; and,
detecting the unavailability of the first networked device; and,
wherein multicasting a byebye message for advertised UPnP elements associated with networked devices that are no longer available that left the network without broadcasting a byebye message includes multicasting a byebye message for UPnP elements associated with the first networked device via each of the plurality of network interfaces.

7. The method of claim 1 wherein maintaining a list of available networked devices includes:
a master device periodically polling slave devices in a Bluetooth piconet; and,
maintaining a list of slave devices that acknowledge the polling.

8. The method of claim 1 wherein maintaining a list of available networked devices in a network includes:

an access point (AP) polling station (STA) devices registered with the AP in an IEEE 802.11 wireless local area network (WLAN); and,
maintaining a list of STA devices sending acknowledgements in response to the polling.

9. The method of claim 1 wherein maintaining a list of available networked devices in a network includes:
an Ethernet switch monitoring link integrity signals from connected devices in an IEEE 802.3 Ethernet network; and,
maintaining a list of devices sending the link integrity signals.

10. In a UPnP network, a system for multicasting a byebye message by proxy, the system comprising:
a monitor hardware device including:
a transceiver having a first and second network interface to search for available networked devices and to receive advertised UPnP element information including a ssdp:alive message;
a controller having an interface to receive the networked device and UPnP element information from the transceiver, the controller extracting a universal resource locator (URL) parameter from the alive message, using the URL parameter to determine a MAC address for a networked device, using the determined MAC address to access a list of available networked devices, and, if the determined MAC address is found in the list of available networked devices, adding the UPnP element to a record, the controller maintaining a first list of available networked devices accessible through the first network interface, a second list of available networked devices accessible through the second network interface, and the record of advertised UPnP elements, the controller determining advertised UPnP elements in the record that cannot be cross-referenced to available networked devices, and so determining unavailable devices that left the network without broadcast a byebye message, removing UPnP elements from the record that are associated with unavailable networked devices that left the network without transmitting a byebye message, and supplying a signal in response to comparing the list of available networked devices to the record of advertised UPnP elements;
wherein the transceiver, in response to the signal from the controller, multicasts a byebye message for advertised UPnP elements that are no longer available, associated with networked devices that are no longer available after leaving the network without broadcasting a byebye message, including the case where the transceiver fails to detect the first networked device in response to performing a search for the first networked device via the first and second network interfaces, and multicasts a byebye message for UPnP elements associated with the first networked device via both the first and second network interfaces.

11. The system of claim 10 wherein the controller maintains a record of UPnP element types selected from the group including root devices, each device embedded in a root device, services associated with a root device, and each service associated with an embedded device; and,
wherein the transceiver multicasts a byebye message for each UPnP element type associated with a networked device that is no longer available that left the network without broadcasting a byebye message.

12. The system of claim 10 wherein the transceiver monitors multicast UPnP element advertisements; and, wherein the controller enters the UPnP element to the record in response to the transceiver receiving an advertisement.

13. The system of claim 10 wherein the controller maintains notification type (NT) and unique service name (USN) fields for each advertised UPnP element in the record; and,
wherein the transceiver multicasts the NT and USN fields in the byebye message.

14. The system of claim 10 wherein the transceiver receives a byebye message from a UPnP element; and,
wherein the controller removes the advertised UPnP element from the record of UPnP elements in response to the transceiver receiving the byebye message.

15. The system of claim 10 wherein the transceiver has a plurality of network interfaces;
wherein the controller maintains a list with the availability of a first networked device accessible through each network interface;
wherein the transceiver fails to detect the first networked device in response to performing a search for the first networked device via each network interface, and multicasts a byebye message for UPnP elements associated with the first networked device via each network interface.

16. The system of claim 10 wherein the monitor is a master device periodically polling slave devices in a Bluetooth piconet, and maintaining a list of slave devices that acknowledge the polling.

17. The system of claim 10 wherein the monitor is an access point (AP) polling station (STA) devices registered with the AP in an IEEE 802.11 wireless local area network (WLAN), and maintaining a list of STA devices sending acknowledgements in response to the polling.

18. The system of claim 10 wherein the monitor is an Ethernet switch monitoring link integrity signals from connected devices in an IEEE 802.3 Ethernet network, and maintaining a list of devices sending the link integrity signals.

* * * * *